United States Patent
Mehta et al.

(10) Patent No.: US 6,681,301 B1
(45) Date of Patent: Jan. 20, 2004

(54) SYSTEM FOR CONTROLLING MULTIPLE MEMORY TYPES

(75) Inventors: Pratik M. Mehta, Austin, TX (US); James R. Magro, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 154 days.

(21) Appl. No.: 09/969,303

(22) Filed: Oct. 2, 2001

(51) Int. Cl.[7] ............................................... G06F 12/00
(52) U.S. Cl. ...................... 711/154; 365/233; 365/193; 711/105
(58) Field of Search ............................... 711/154, 105; 365/193, 233

(56) References Cited

U.S. PATENT DOCUMENTS

| | | | |
|---|---|---|---|
| 5,812,816 A | 9/1998 | Parady | 711/165 |
| 5,918,242 A | 6/1999 | Sarma et al. | 711/5 |
| 6,055,613 A | 4/2000 | Parady | 711/165 |
| 6,459,651 B1 * | 10/2002 | Lee et al. | 365/233 |
| 6,487,623 B1 * | 11/2002 | Emerson et al. | 710/302 |

* cited by examiner

*Primary Examiner*—Donald Sparks
*Assistant Examiner*—Kathy Takeguchi
(74) *Attorney, Agent, or Firm*—Meyertons Hood Kivlin Kowert & Goetzel, P.C.; B. Noël Kivlin

(57) ABSTRACT

A system that enables a memory controller to control data transfers with memory modules, such as DIMMs (double in-line memory modules), of either a "by 4" (×4) type or a non-by-4 type (non-×4). Both ×4 and non-×4 DIMMs may be used in the system simultaneously, and the memory controller dynamically adjusts its enable and other signals as needed. Data strobe signals are provided to and from DIMMs over a data strobe transfer circuits which in the case of a non-×4 DIMM handles data strobes for an entire byte of data, while in the case of ×4 DIMM the data transfer circuit handles data strobes for one nibble (four bits) of a byte of data. A hybrid data mask/data strobe transfer circuit handles the other nibble of a byte of data in the case of data transfers for ×4 DIMMs, and handles data mask signals for write operations for non-×4 DIMMs.

23 Claims, 5 Drawing Sheets

SYSTEM FOR CONTROLLING MULTIPLE MEMORY TYPES

BACKGROUND OF THE INVENTION

Memory modules in use in processor-based systems currently use RAM (random access memory), in particular DRAM (dynamic RAM) of several types, referred to as ×4 ("by 4"), ×8, ×16 or ×32. The designation ×4 means that the DRAM on a DIMM (dual in-line memory module) provides four bits of data at each clocking out of data, which in single-data read systems occurs on each rising edge of the clock on the system bus. Because current systems often use a 64-bit data width for data accesses, a DIMM with ×4 DRAM must have sixteen ×4 (i.e. sixteen four-bit) DRAM chips (or other memory devices, e.g. SDRAM, SRAM, etc.) to accommodate the full 64 bits of word length. Similarly, a ×8 DIMM (i.e. a DIMM with ×8 DRAMs) would need eight such 8-bit devices, and a DIMM with ×16 DRAMs would need four such 16-bit DRAMs to make up a full 64-bit word.

Recent systems have begun to use DDR (double-data rate) DIMMs, which allow clocking of data on both rising and falling edges of the data strobes from the DIMMs, thus doubling the rate at which data transfers to and from the DIMMs can be made. DDR DIMMs in use today typically carry ×4, ×8 or ×16 devices. In the JEDEC specification entitled "Double Data Rate (DDR) SDRAM Specification" (JESD79), incorporated herein by reference, the data strobe is referred to the "DQS" signal, and the actual data provided by or to the DRAM device is referred to as the "DQ" signal.

Unlike synchronous DRAM devices, DDR DRAM devices use a source-synchronous clocking mechanism for data transfers between the DIMMs and the memory controller, with the memory controller of the system providing the DQS strobe as the source synchronous signal during write operations, and the DDR devices providing the DQS strobes during read operations. Thus, during write cycles, the memory controller provides both the DQ signals and the DQS strobes to the DDR DIMMs, while during a read operation the DDR DIMM provides the DQ and DQS signals.

An important design consideration for memory subsystems relates to the number of data strobes that are necessary for a given DIMM (×4, ×8, ×16, etc.) to clock out an entire 64-bit data word. Since a byte of data contains 8 bits, it is conventional with devices of at least 8-bit width (i.e. ×8, ×16 or ×32 devices, often referred to as "non-×4") to clock one byte of data with one data strobe, and thus for such devices a 64-bit word requires 8 data strobes (accommodating 8 data bits each).

However, a ×4 device can clock out only 4 bits at a time, so an 8-bit byte requires two DQS strobes, and a 64-bit word requires 16 DQS strobes instead of the only 8 strobes for non-×4 devices. In general, for any non-×4 devices, including any future devices that may clock out greater numbers of bits such as 64, 128 and so on, only 8 DQS strobes will be required for a 64-bit word. It is when the number of bits that the device accommodates is less than the number of bits in a byte that the DQS strobe number increases.

In conventional DIMMs in use today, there are not enough pins available to provide an extra 8 pins in case a DIMM is carrying ×4 DRAM. This limit comes from physical limitations on the sizes of the DIMMs. Thus DIMMs in use today generally support only 8 data strobes.

However, DIMMs also use pins that carry signals known as data mask signals, generally including one such pin per 8 data pins. One data mask bit on a data mask pin can be used to mask (i.e., either block or pass) an entire byte of data, as needed by the system for conventional data handling purposes. It is possible to use these data mask pins as DQS strobe pins when a ×4 DIMM is in use, at the expense of losing the data masking functionality that would otherwise be available.

When the data mask pins are used in this way, the lower 4 bits of data (the "lower nibble") for a given byte may be clocked with the usual data strobe over the data strobe pin, and in that case the data mask pin for a given data byte clocks the upper 4 bits (the "upper nibble") of the byte.

A problem with using the data mask pins as data strobes for ×4 devices is that the timing requirements for data strobes are different from those for data mask bits. Data mask bits are clocked with the actual data, i.e. they are provided to a DIMM (in the case of a write operation) substantially simultaneously with the data itself. If the data mask signal and the actual data signal are not coordinated in this way, unpredictable results (such as corrupt data or incorrectly masked data) may occur.

Data strobes, on the other hand, conventionally include a preamble and a postamble period, allowing for proper setup and hold of the data-receiving component, such as the read data FIFO of a memory controller. In addition, data strobes are coordinated with a data valid window of the associated data at the receiving components. Thus, a system that accommodates both data mask signals and data strobes over a given circuit should take into account the different timing requirements of the two types of signals.

In the case of a ×4 device, if the data mask pins are to be used for data strobes (for the upper nibble), the timing of these upper nibble data strobes must be coordinated with the timing of the lower nibble data strobes over the usual data strobe line.

A challenge is therefore presented of providing a multimode system that can correctly execute read and write commands to memory modules of different types, namely ×4 and non-×4, while automatically providing correct timing of data signals, data strobes, and data mask signals, depending upon which type of memory a user has installed.

SUMMARY OF THE INVENTION

A processor-based system is described that can use DIMMS carrying either ×4 or non-×4 devices (referred to herein as ×4 DIMMs and non-×4 DIMMs, respectively), or any combination of ×4 and non-×4 DIMMs. A ×4 or non-×4 device refers to a chip or circuit, such as a memory chip on board a DIMM, that clocks out data on a four-bit basis or any non-four-bit (e.g. 8-bit, 16-bit, etc.) basis, respectively.

The system includes a memory controller, which identifies each DIMM as being of a ×4 or a non-×4 type, typically from information provided by the DIMM itself. The memory controller can receive this information dynamically (including by a hot-plugged DIMM), and thus simply plugging in the DIMM is sufficient to allow the system to handle its read and write operations correctly.

Four types of operations are contemplated: a read operation for a non-×4 DIMM (or other memory component); a read operation for a ×4 DIMM; a write operation for a non-×4 DIMM; and a write operation for a ×4 DIMM. In each case, the system controller controls circuit connections (including data mask pins, MUXes, gates and buses) in such a way as to pass the necessary signals to and from the DIMM for the given operation. For a non-×4 DIMM, data mask signals are provided to the DIMM in a write operation, while the data mask lines are tristate for a read operation. For a ×4 DIMM, data strobes for the upper nibble of each byte are MUXed through the appropriate connections to (or from) the data mask pins for a read (or a write).

Multiple DIMM interface modules are provided, each of which handles some portion of an entire data word. Thus, for a 64-bit word, in one implementation eight 8-bit interface modules are used, plus an additional 8-bit module to handle ECC signals. Each module in this embodiment includes a one-bit FIFO array, and the FIFO arrays of all the modules together comprise the read data FIFO for the system.

The interface modules may be sized to handle different amounts of data and their number selected to scale the system up or down to accommodate systems using different byte or word sizes.

DESCRIPTION OF THE PREFERRED EMBODIMENTS

Figure 1:
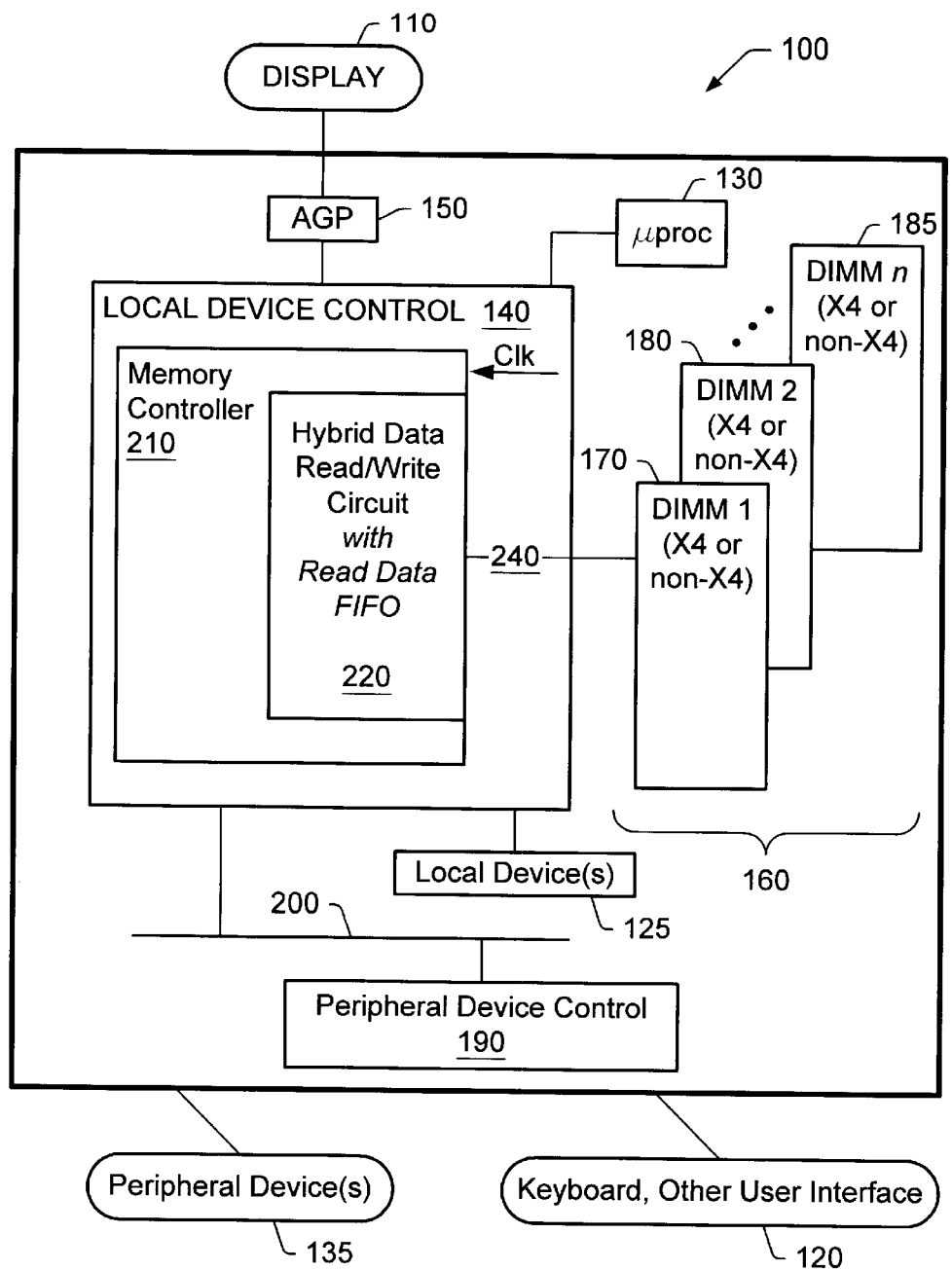
FIG. 1 is a block diagram of a system incorporating features of the present invention.

FIG. 1 shows a processor-based system 100, such as a workstation or a server, in connection with which an embodiment of the present invention may be used. The system 100 is coupled to a display 110, typically several interface devices 120 (such as mouse, keyboard, track ball, etc.), and operates under control of at least one microprocessor 130 (though it may be a multiprocessor system).

The processor 130 is connected to a local device control circuit 140 (also referred to as a "host bridge"), which includes circuitry that controls data and command exchanges with local devices such as the display 110 (via an accelerated graphics port (AGP) 150) and memory 160, which may in a typical system include multiple DIMMs (dual in-line memory modules) 170–185, or other suitable memory modules or media.

The local device control circuit 140 is connected to a peripheral device control circuit 190 via a bus such as PCI bus 200, and the circuit 190 in turn is connected to conventional peripheral devices 135, and governs their interaction with the system 100.

The local device control circuit 140 may in many respects include conventional or known circuitry (with the addition of the inventive features described below), but may in particular incorporate features of the design of system controller (e.g., "Northbridge" or AMD-762™ controller) circuits of Advanced Micro Devices, Inc. (AMD). The peripheral device control circuit 190 may likewise in most respects be conventional or known circuitry, but may incorporate features of AMD's peripheral bus controllers (e.g., the "Southbridge" or AMD-766™ controller).

Other elements of the system 100 will typically be present, but are not shown in FIG. 1 for the sake of clarity. For instance, the system 100 would include a bus interface unit, AGP logic, a graphics adapter table, a PCI host bridge, and other conventional or special-purpose subsystems useful in operating the system, but which do not enter into the description of the present invention.

The local device control circuit 140 includes a memory controller 210, which is coupled to and controls the operation of DIMM 1 (170) and DIMM 2 (180)—and, as desired, additional DIMMs as indicated by the dots through DIMM n (185)—using a hybrid data read/write circuit 220 which includes a read data FIFO. The circuit 220 is coupled to the DIMMs via a bus 240.

The DIMMs 170–185 are accessed for read and write operations by conventional chip select lines in bus 240, and thus the data signals, data strobes, data mask signals, ECC signals and other necessary signals (command, RAS, CAS, and so on) are all passed between the memory controller 210 and the DIMMs over the bus 240. Except for the treatment of the different ×4 and non-×4 data, data mask and DQS (data strobe) signals as described below, the signals and communication between the memory controller 210 and the DIMMs 170–185 may be implemented in a conventional manner.

As indicated in FIG. 1, each of the DIMMs 170–185 may include ×4 DRAM or non-×4 DRAM (e.g. ×8 or ×16 devices). Thus, DIMM 170 may be a ×4 device and DIMM 180 (or other DIMMs through DIMM 185) may be a non-×4 device, or vice versa; or there may be any combination of ×4 and non-×4 devices. The hybrid circuit 220 automatically accommodates both ×4 and non-×4 DIMMs, in a manner described below.

The number of DIMMs used in the system 100 will be determined by the specific design of the system. Thus, one or multiple DIMMs may be used in conjunction with circuit 220.

Figure 2:
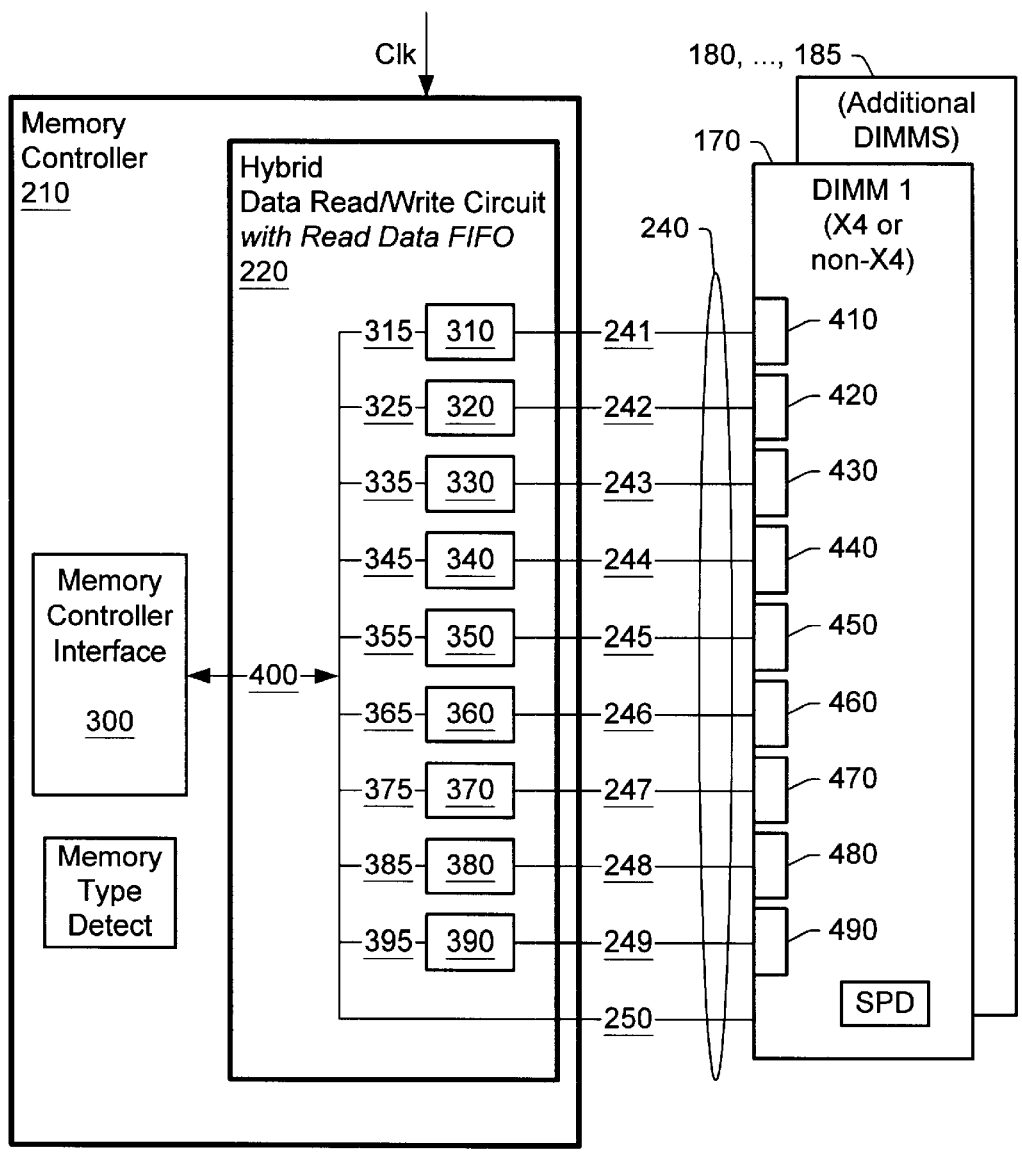
FIG. 2 is a block diagram showing details of the memory controller and DIMMs of FIG. 1.

FIG. 2 shows details of the hybrid read/write circuit 220. The circuit 220 transmits and receives signals to and from DIMM 170 (and DIMMs 180, . . . , 185) via a bus 240 (also shown in FIG. 1).

Bus 240 may be regarded as including sub-buses 241–250, which for a 64-bit system may handle 8 bits of data or ECC each, plus DQS and data mask signals. Thus, sub-buses 241–248 may carry actual data, while sub-bus 249 carries ECC data. Control signals, address signals, and other conventional signals used for memory operations with DIMMs are carried over sub-bus 250.

The circuit 220 includes, in this embodiment (i.e. in a system using 64-bit words), nine DIMM interface modules 310–390, which communicate with a memory controller 300 via sub-buses 315–395, respectively, and bus 400. Signals passing over bus 250 are likewise transferred to and from memory controller interface 300 over bus 400.

The DIMM interface modules are coupled to DRAM chips 410–490 of DIMM 170 via the sub-buses 241–249, respectively.

The DRAM chips may in fact be any suitable memory chips or circuits, including chips using other appropriate technologies (SRAM, SDRAM, etc.), and as mentioned may be either ×4 or non-×4 devices. It will be appreciated that other byte sizes and system word sizes (e.g. 128-bit and 256-bit) may be accommodated, as well as different sizes of DIMMs or other memory modules, by altering the specific numbers of data bits and other signals handled by the various buses and sub-buses and the interface modules as necessary.

For a DIMM, which includes memory chips on both sides, there will be another set of DRAM (or other technology) chips similar to chips 410–490 on the opposite side of the circuit board, which can be selected by a chip select signal in a conventional manner. For the sake of clarity, these components and other conventional components (such as drivers or buffers) are not shown in FIG. 2, though in practice they would be included as desired on a given DIMM.

Figure 3:
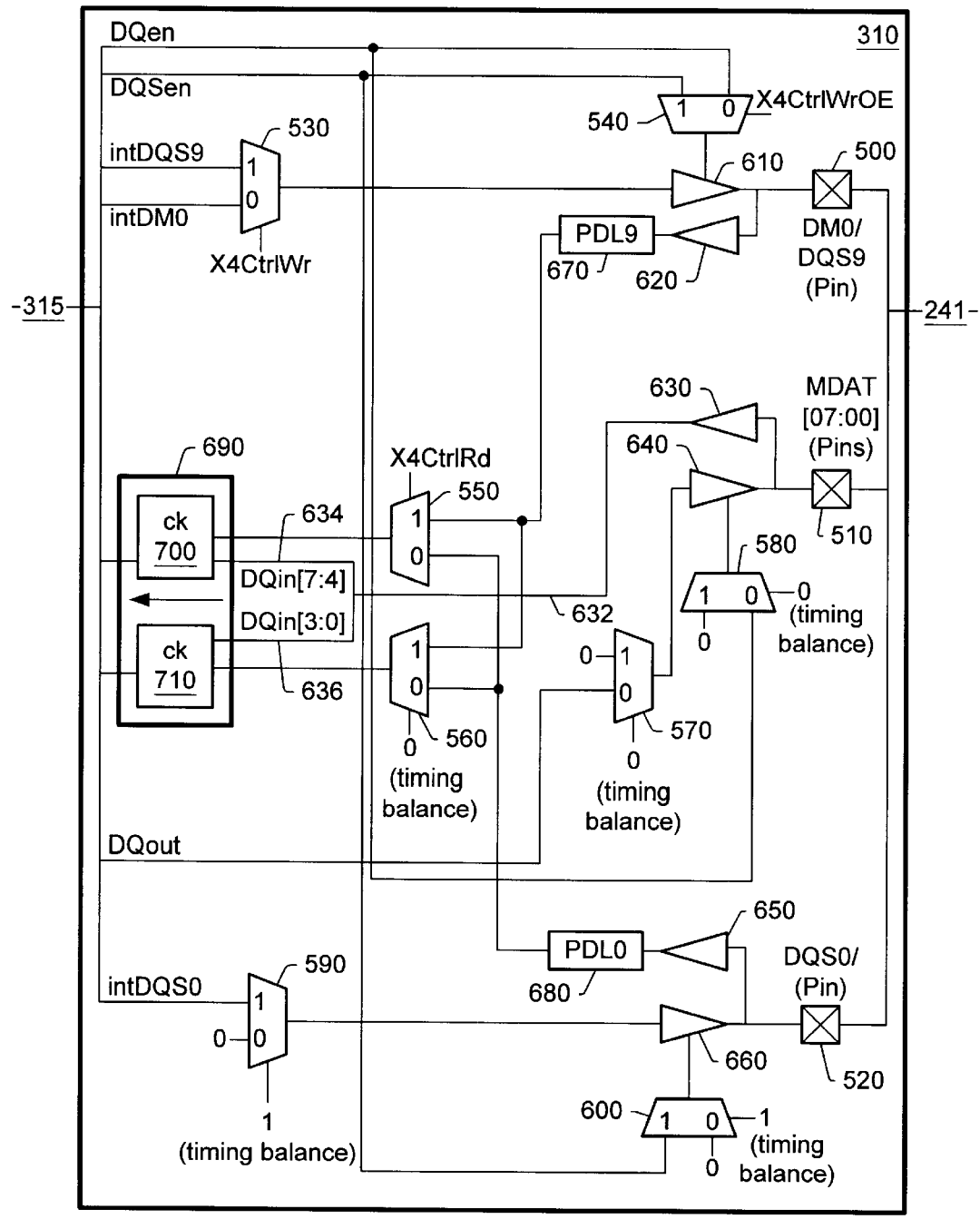
FIG. 3 is a circuit diagram of a memory interface module suitable in implementing an embodiment of the invention.

FIG. 3 shows greater detail of the DIMM interface module 310. Modules 320–390 are substantially identical to module 310, though the precise layout, wiring arrangements, etc., may be different.

The DIMM interface module 310 handles the necessary data, data strobe and data mask signals for read and write commands for both x4 and non-x4 devices. For instance, for a write operation to a DIMM, the data, data strobe and data mask signals as appropriate for the particular write operation are passed from the memory controller via bus 315 through the circuit 310 and then via bus 241 to the DIMM 170. Similarly, in a read operation from a DIMM, the necessary DQ (data) and DQS (data strobe) signals are passed from the DIMM 170 via bus 241 through circuit 310, and the data (DQ) signals are then transmitted over bus 315 to the memory controller interface 300. These operations are discussed in detail below.

Data, data strobes and data mask signals are likewise passed to and from the DIMMs through the other interface modules 320–390 in a manner substantially identical to that of module 310, with each module in this embodiment handling one byte (i.e. 8 bits) of data plus associated mask and data strobe signals. Other bit-widths for the modules 310 may be implemented, using the features of the present invention.

In a read operation for a non-x4 device, the data mask signal is not used, so the data mask is in a tristate, i.e. an undefined state that is maintained neither high nor low. In a read operation for a x4 device, the data mask pin is used for a DQS strobe, as described below.

Circuit 310 transmits and receives signals to and from the DIMM 170 via pads 500, 510 and 520, which are the connections for the respective I/O (input/output) paths between the memory controller and the memory module(s). Signals are transmitted to and received from the read/write circuit 220 via the bus 315. The circuit 310 includes MUXes 530–600, gates (e.g. transistors) 610–660, and PDLs (programmable delay lines) 670–680 connected as shown in FIG. 3.

Figure 4:
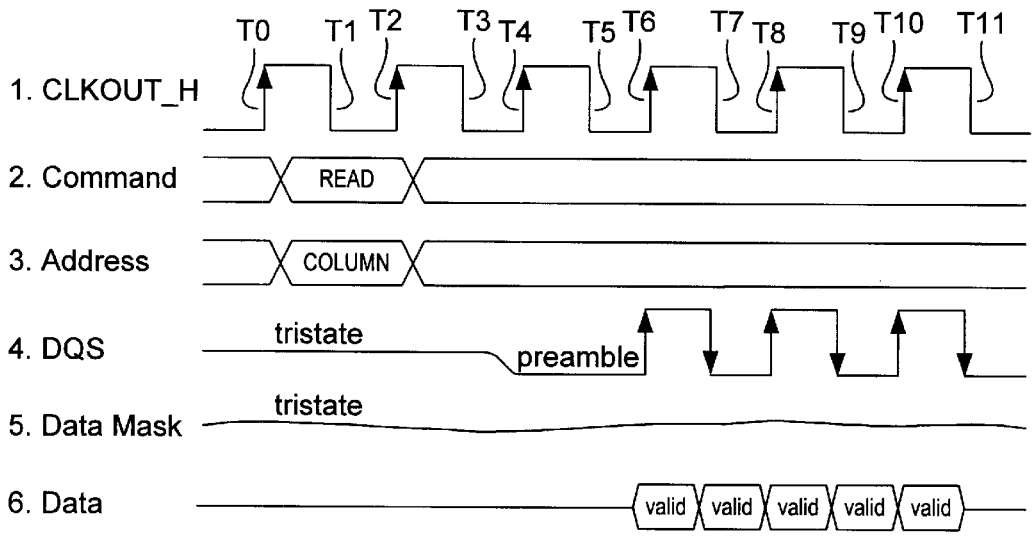
FIG. 4 is a timing diagram illustrating read cycle for a non-×4 memory device used in conjunction with the circuit of FIG. 2.
Figure 5:
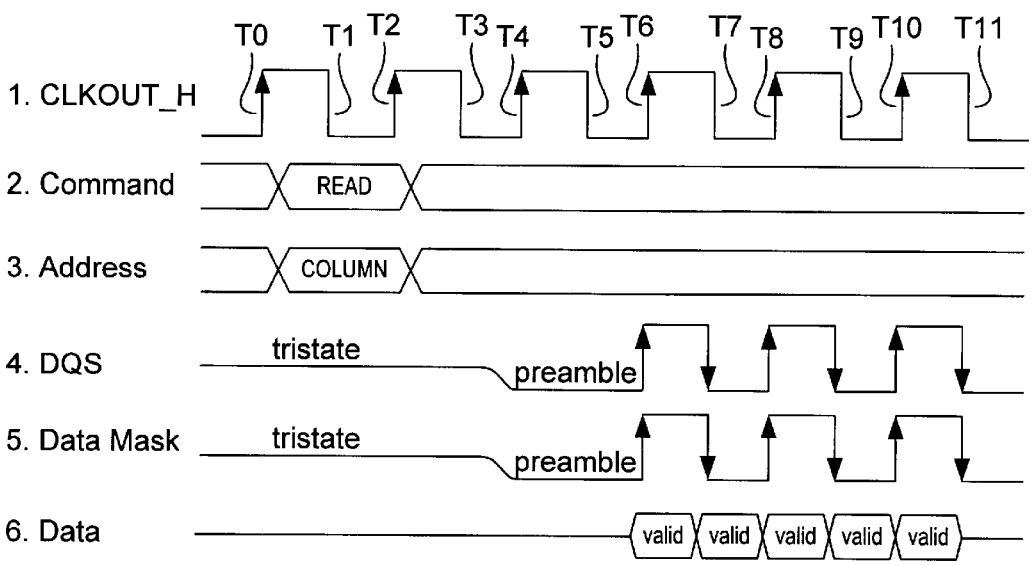
FIG. 5 is a timing diagram illustrating read cycle for a ×4 memory device used in conjunction with the circuit of FIG. 2.
Figure 6:
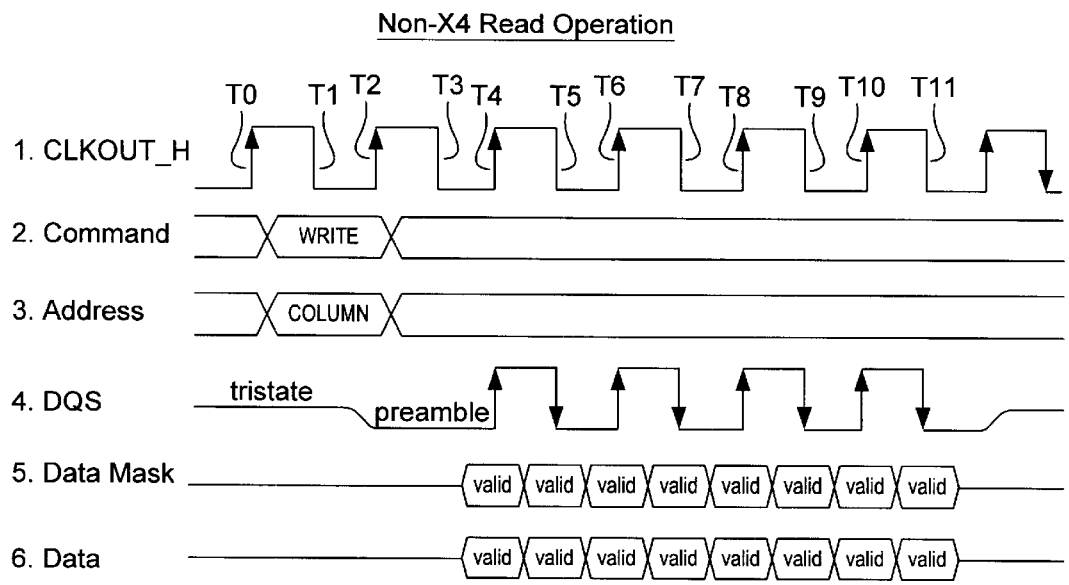
FIG. 6 is a timing diagram illustrating write cycle for a non-×4 memory device used in conjunction with the circuit of FIG. 2.

Given read and write operations for either x4 or non-x4 devices, there are thus four possible types of operations, with timing diagrams as shown in FIGS. 4–7. In particular:

FIG. 4 shows the timing of a read operation to a non-x4 device;

FIG. 5 shows the timing of a read operation to a x4 device;

FIG. 6 shows the timing of a write operation to a non-x4 device; and

Figure 7:
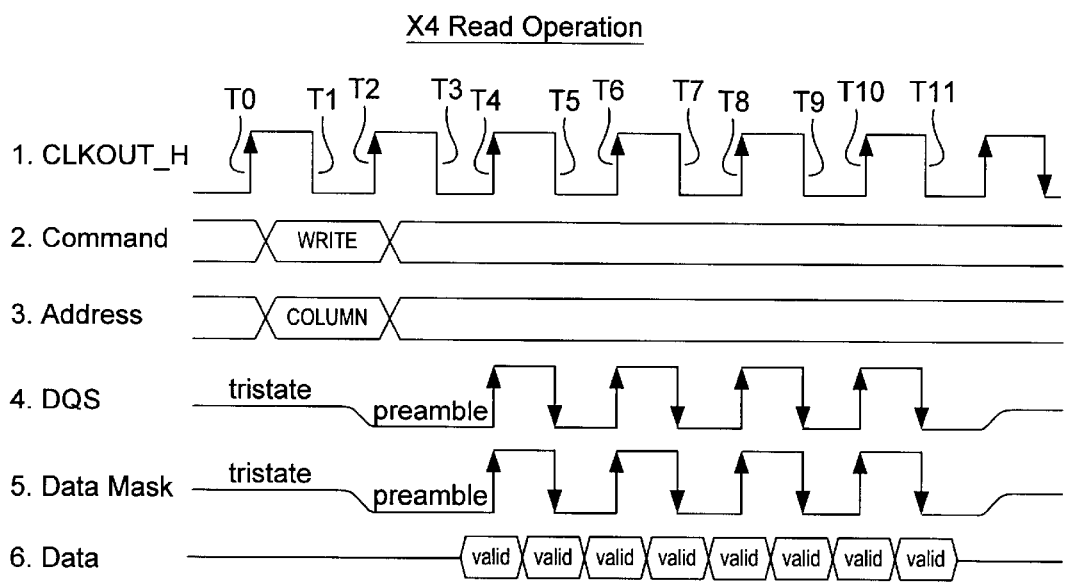
FIG. 7 is a timing diagram illustrating write cycle for a ×4 memory device used in conjunction with the circuit of FIG. 2.

FIG. 7 shows the timing of a write operation to a x4 device.

Each of these four cases will be discussed below.

Read or write access to a DIMM 170 is requested by a device, such the system 100 (including the microprocessor 130) or any of a number of local devices 125 or peripheral (or remote) devices coupled to the system 100. Such requesting devices may include any of a number of conventional devices, such as graphics subsystems, network adapters, storage devices, I/O devices, remote processor-based systems, and so on, i.e. any hardware or software that may request access to a memory module for read or write operations.

The memory controller 210 handles the DIMM access requests. In the case of a read request, the DIMM responds by providing the requested data, along with a DQS strobe that latches the data into the read data FIFO in a coordinated operation. That is, the data signals are provided by the DIMM 170, and after a certain setup time, which depends upon the circuit layout and the inherent delay times of its components, the DQS strobe is provided.

The timing between data signals and data strobes is carried out in a coordinated fashion. The DQS (data strobe) signal is delayed to coordinate its arrival at the read data FIFO with the DQ (data) signals, in part because of the setup time required by the latching circuitry of the FIFO array when it receives the data signals.

Following are descriptions of both the read and write operations for x4 and non x4 memory modules.

Data Read Operation Involving Memory with Non-x4 DRAM (FIG. 4)

Referring to FIGS. 3 and 4, when a read request is being executed by the DIMM 170, if DIMM 170 has non-x4 DRAM then it provides 8 bits of data and one DQS strobe from each of the DRAM chips 410–490 to the respective interface modules 310–390. The following discussion will deal with the signals through the module 310, but should be understood to apply to all of the modules 310–390.

The DQS strobe is provided at the DQS0 pin 520, and it passes through gate 650 and PDL0 680 to the "0" line inputs of MUXes 550 and 560. There is a signal "intDQS0", which is an internal (i.e. generated within the memory controller) data strobe and which is set high only for write operations. Thus, in this read operation, the signal from MUX 590 is low.

The DQSen signal from the memory controller 210 is also low during a read operation, and thus the line 1 input to MUX 600 is low, and since this input governs gate 660, gate 660 is disabled and does not affect the DQS signal passing through gate 650.

Accordingly, the only signal passing through the PDL 680 to the MUXes 550 and 560 is the DQS0 data strobe from the DIMM 170 through the DQS0 pin 520.

Eight bits of data are provided by DRAM 410 via bus 241 through MDAT pins 510. The [07:00] designation at pin 510 indicates that these are bits 0–7 (i.e. the first eight bits) of the entire 64-bit word being provided by the DIMM 170. Bits 0–7 pass through gate 630, over bus 632 and via buses 634 (for the upper 4 bits) and 636 (for the lower four bits) to the FIFOs 700 and 710 in read data FIFO array 690.

The FIFO array 690 thus queues up 8 bits of data. There is a similar such array in each interface module 320–390, and all together, the respective FIFO arrays provide queuing for all 64 bits of the data word, plus 8 bits of ECC. For a 128-bit system, they would accommodate 128 bits of data plus 16 bits of ECC, in a conventional manner. Thus, generally, the "read data FIFO" for the entire system can be understood to mean all the FIFO arrays such as 690 taken together.

When a non-x4 DIMM is being accessed (i.e. a DIMM carrying non-x4 devices), this is communicated from the DIMM to the memory controller by a conventional means of self-identification, such as by use of a configuration bit or bits. Thus, when the memory controller issues the read command to the DIMM 170, it has the information of what type of DIMM it is accessing, and therefore whether it should execute a ×4 memory access operation or a non-×4 memory access operation.

The DIMM type can be communicated to the memory controller by a conventional inquiry to a serial presence detect (SPD) module 495 on board the DIMM, as shown in FIG. 2, and the type information can be communicated to the memory controller (e.g. to a memory type detect module 255) via the bus 250. The identification of the type of given DIMM should be carried out before any data transfers to or from that DIMM have been carried out, so that the correct signals can be provided by the memory controller. The identification procedure can be carried out at boot-up of the system, or as an alternative, when a DIMM is hot-plugged into an already active system.

Other identification mechanisms are possible, including the physical shape of the DIMM, user-input information that is written to a configuration table in communication with the memory type detect module 255, etc. Once the DIMM is identified as being of a ×4 or non-×4 type, then all data reads and writes to that DIMM are automatically given the appropriate signals to enable the particular paths through the data transfer (I/O) circuitry of FIG. 3. Thus, the memory controller governs these signals based upon the type information, and any executing software on the processor-based system does not need to be provided with information about which type of memory it is accessing.

In one embodiment, the enable signals and ×4 read and write control signals discussed herein are all provided by the memory controller to govern the operation of the interface modules 310–390. Alternative embodiments are possible, wherein one or more DIMMs provide some or all of these signals. As more circuitry and logic is included on DIMMs, or as memory modules are provided with processors and greater I/O capabilities, the memory modules will be able to handle some of these control operations themselves, and it is thus possible to configure a memory module with all or essentially all of the capabilities and circuitry described herein with respect the memory controller 210.

In the present example, the DIMM 170 is assumed to be a non-×4 device. In this case, the memory controller provides a 0 signal as the ×4CtrlRd (×4 control read) select signal to MUX 550. Since the select signal for MUX 560 is tied to 0, as indicated, in the case of a read request to a non-×4 device, both MUXes 550 and 560 pass the signals appearing on their respective line 0 inputs through to the data FIFO array. These inputs are the same signal, namely the DQS strobe input from the DIMMs via pin DQS0 (520).

Given proper timing of the data (over bus 632) with the data strobe (via the PDL0 (680) and through the MUXes 550 and 560), a correct capture of the data from a non-×4 device is achieved.

The timing of such an operation appears in FIG. 4, where the system clock signal appears on line 1. If a read command is issued at time T0, then a short time later the read command and address signals appear on bus 250 (see FIG. 2 and lines 2–3 of FIG. 4). Before the command is issued, the DQS signal on bus 241 (appearing at DQS0 pin 520) will typically be in a tristate mode. After the read command is processed by the DIMM 170, the DQS enters a preamble and then drives the data (see lines 4 and 6 of FIG. 4), e.g. beginning at time T6 in line 1 of FIG. 4. (In FIGS. 4–7, the clock, command and address signals of lines 1–3 are provided by the memory controller 210.)

In a read operation, the data mask signal is not used, and it remains in a tristate condition, as indicated at line 5 of FIG. 4.

For the example of FIGS. 4–7, it will be assumed that the DIMM is an unregistered (unbuffered) DIMM with DDR devices having a CAS latency of 2. In this case, at times T6–T10 (and following, depending upon the amount of data being accessed), data is driven at every half-cycle of the clock (line 1), i.e. with each rising and falling edge of the DQS strobe (line 4). This is, as discussed above, a feature of a DDR system, which clocks data at double the rate of a single-data read system (assuming the same system clock frequency).

Although there is another possible input to gate 630 in FIG. 3, coming from gate 640, in the case of a read command this input is disabled, because the DQen signal coming in from bus 315 (and thus from the memory controller 210) is at this time low. As a result, the input at line 0 to MUX 580 is low, and gate 640 is accordingly blocked. The DQen signal is high only during a write operation to the DIMM 170, discussed below.

The DQen signal is also provided as the line 0 input to MUX 540. The signals ×4CtrlWr (×4 control write) and ×4CtrlWrOE (×4 control write output enable) from the memory controller 210 to the select line of MUX 540 are 0 (i.e. not set) for a read operation (it is set, i.e. high, only for an ×4 write operation). Thus, line 0 of MUX 540 is selected in this operation, and the low value of DQen is provided to gate 610, which is therefore disabled.

For timing reasons, it may be that the signals ×4CtrlWr and ×4CtrlWrOE should be generated at different times, to be provided with the appropriate timing at the different parts of the circuit as shown. Thus, in the present description they are referred to as different signals. However, with appropriate design, the same signal (e.g. ×4CtrlWrOE) can be used for the select lines of both of the MUxes 530 and 540. Reference to either implementation herein should be taken as encompassing the other, equivalent implementation.

The tristate data mask signal passes through the DM0/DQS9 pin 500, gate 620 and PDL9 (670) to the line 1 inputs of MUXes 550 and 560. However, as discussed above, lines 0 are selected for each of these MUXes in this non-×4 read operation (because ×4CtrlRd is 0 at MUX 550, and the select line at MUX 560 is always 0). Thus, the tristate mask signal has no effect on the data capture operation.

The circuitry coupling pin 500 to the bus 315 (including at least MUXes 530–550, gates 610–620, PDL 670, MUX 550 and the read data FIFO array 690) thus constitutes a hybrid data mask/data strobe transfer circuit between the memory controller and the memory module. Likewise, the circuitry coupling pins 510 to the bus 315 (including at least MUXes 570–580, gates 630–640 and the read data FIFO array 690) thus constitutes an actual data transfer circuit. Finally, the coupling pin 520 to the bus 315 (including at least MUXes 590–600, gates 650–660, PDL 680, MUXes 550–560 and the read data FIFO array 690) thus constitutes a data strobe transfer circuit between the memory controller and the memory module.

Generally, the MUXes and gates of these transfer circuits can be considered gating components that carry out the selection and gating operations described herein. Thus, while FIG. 3 shows one embodiment of the present invention, alternative gating component arrangements are possible that can achieve the same results.

Accordingly, in a non-×4 read operation, the data from the DIMM 170 is provided to the data FIFO array 690 via bus 632, and the DQS strobe is provided to the FIFOs 700 and 710 to clock in the received data via MUXes 550 and 560. The PDL0 (680) is configured to ensure that the DQS strobe arrives at during the data valid window for the data on bus 632, and thus a successful data capture is enabled.

In FIG. 2, as mentioned above, the other seven data chips 420 provide the other bits of data for the 64-bit word (or other word length, according to the design), and chip 490 provides the 8 ECC bits for the data word. Thus, chip 420 may provide bits 8–15, chip 430 provides bits 16–23, and so on, with chip 480 providing bits 56–63, for a total of 64 actual data bits and 8 ECC bits provided over bus 270 to the read data FIFO. Other configurations of the circuits 310–390 can be implemented for other word lengths.

Data Read Operation Involving Memory with x4 DRAM (FIG. 5)

A read operation for a DIMM having x4 devices is similar to that for a DIMM having non-x4 devices, except that the tristate data mask signal of line 5 in FIG. 4 is replaced by driven DQS strobe (line 5 in FIG. 5). As with a non-x4 read operation, the DQ and DQS signals are provided by the DIMM 170. In addition, the signal x4CtrlRd is provided by the memory controller (or alternatively, it may be provided by the DIMM) at the select line of MUX 550.

For this example, it will be assumed that the DIMM 170 is a x4 DIMM, and thus that it both provides identification to the memory controller reflecting this, and sends DQS0 and DQS9 data strobes for the lower and upper nibbles of an 8-bit byte of data. The DQS9 strobes are sent over the pins that would normally be used for a data masking signal, and thus are received by module 310 at pint 500.

The DIMM 170 also sends two DQS strobes to each of the modules 320–390, one for the lower nibble and one for the upper nibble of the respective bytes. For instance, in the 64-bit word embodiment, module 320 would receive DQS1 and DQS8; module 330 would receive DQS2 and DQS11; and so on, with module 390 receiving DQS8 and DQS 15 for the ECC information.

Because this operation is a x4 read operation, the signal x4CtrlRd is high, and line 1 of MUX 550 is selected. Line 0 of MUX 560 is selected as in the non-x4 read operation. As indicated, line 0 of MUX 560 is in fact always selected (i.e. it is tied to 0) and thus the connection from the output of PDL 670, which is provided as input on lines 1 of MUXes 550 and 560, is never passed through MUX 560 because line 1 of that MUX is never selected. It is connected in the fashion shown to provide timing and load balancing for the circuit, and in particular to balance the inputs at the two MUXes 550 and 560.

Since intDQS0 is low for a read operation, as in the non-x4 read operation discussed above the output of MUX 590 and the input to gate 660 are low. In addition, DQen and DQSen are low, and thus the input to MUX 600 is low. Thus, gate 660 both has a low input and is disabled by the low output from MUX 600, and gate 650 accordingly receives its input from the DQS0 pin 520, shown in line 4 of FIG. 5.

Since x4CtrlWrOE is low (i.e. not set), gate 610 is disabled, and the input to gate 620 comes from pin 500, namely the DQS9 output from the DIMM. This is passed through the PDL9 (670) and into MUX 550, where it is selected on line 1.

Thus, MUX 550 passes the DQS9 signal through to the FIFO array 690, and MUX 560 passes the DQS0 signal through. In addition, the DIMM provides a byte of data to pins 510, which passes the 8 bits through gate 630 and onto bus 632, and then to buses 634 and 636. Note that gate 640 is disabled because DQSen (which is output from MUX 580, and governs gate 640) is low for a read operation. (DQout— at MUX 570, line 0—is also low for a read operation, so in addition the input to gate 640 happens to be low for this operation.)

The PDLs 670 and 680 ensure that the timing of the data strobes DQS9 and DQS0 are correct for the upper and lower nibbles arriving on buses 634 and 632, respectively. See lines 4–6 of FIG. 5. These upper and lower nibbles are provided to the FIFOs 700 and 710 in the FIFO array 690.

This completes the x4 read operation, which is handled automatically by the circuit of FIG. 5. Whether a x4 or a non-x4 DIMM is plugged into the system, the memory controller handles the data reads from that DIMM correctly, with no change in software or circuitry.

Data Write Operation Involving Memory with Non-x4 DRAM (FIG. 6)

In a write operation, the DQen and DQSen signals from the memory controller 210 are high, and intDQS0 is driven in a conventional manner to write the data. For a non-x4 write operation, the signal intDM0 will be driven to implement data masking, and the signal intDQS9 will not be driven. (For a x4 write operation, these two signals are reversed.) Also, for a non-x4 write operation, signals x4CtrlWr and x4CtrlWrOE are low (these are high only for a x4 write operation).

The memory controller provides the above signals, in addition to data (DQout), over the bus 315 into the module 310. Note that the read data FIFO array 690 does not receive data from the memory controller, but only passes data from the DIMM 170 out to the memory controller.

The one-byte data signal DQout is provided as input on line 0 to the MUX 570, whose select signal is tied to 0, and thus this data signal is passed through to gate 640, which is governed by MUX 580, whose select signal is also tied to 0. Since DQen is high, a high signal passes through MUX 580, and gate 640 is therefore enabled, and the data passes through to MDAT pins 510. (Because of one-way gate 630, no signals that might appear on bus 632 reach the pins 510.) Accordingly, one byte of data is output to the DIMM 170 via bus 241.

Coordinated with this is the internal data strobe, i.e. the intDQS0 signal from the memory controller, which passes through MUX 590 over line 1 (which is always selected) and through gate 660, which is enabled because DQSen is high, and MUX 600 line 1 is selected. Thus, the intDQS0 signal passes through DQS0 pin 520 to the DIMM 170, clocking in the writing of the byte of data from pins 510.

Also coordinated with this operation is the provision of the internal data mask signal, i.e. intDM0 from the memory controller, which passes through MUX 530 (since line 0 is selected, x4CtrlWr being low). The intDM0 signal then passes through gate 610, which is enabled in a manner timed with DQen, because line 0 of gate 540 is selected (due to x4CtrlWrOE being low). Thus, the data mask signal intDM0 is provided to DM0/DQS9 pin 500, and thence over bus 241 to the DIMM, timed with the arrival of the data signal DQout (both being driven by the DQen signal).

Thus, the module 310 writes a byte of data to the DIMM, masked according to the data mask signal and timed according to the data strobe from the memory controller. The data writing operation timing diagram of FIG. 6 shows the provision of the data (line 6) and data mask signal (line 5) in coordination with the DQS data strobe, from about time T3 through T11 (line 1).

Because of the MUXes 530 and 540 at gate 610, which are provided to distinguish between x4 writes and non-x4 writes, there will be a certain delay of the data mask signal's arrival time at pin 500. If this is uncompensated, the data strobe intDQS0 and actual data DQout could precede the data mask signal by an amount sufficient to corrupt the write operation.

Thus, the intDQS0 signal is passed through MUX 590, which can be referred to as a "dummy" MUX, since its only purpose is delay, i.e. timing balance with MUX 530. Likewise, MUX 600 is a dummy MUX, slightly delaying signal DQSen to compensate for the delay caused by MUX 540. Finally, gate 660 balances the delay caused by gate 610. Depending upon the actual circuit layout, these MUXes 590–600 and gate 660 may be identical to their counterpart MUXes 530–540 and gate 610; or they may be selected to be different, if the path lengths of the respective signals are sufficiently different to make an adjustment desirable.

MUXes 570–580 are dummy MUXes that similarly balance MUXes 530–540, and gate 640 balances gate 610. Again, these respective MUXes and gates may be identical, or selected to be different in such a way that compensates for path length differences as desired.

Data Write Operation Involving Memory with ×4 DRAM (FIG. 7)

Referring to FIG. 7, for a ×4 write operation it is now desired to use the data mask signal lines to transmit an upper-nibble data strobe, so as to clock both upper and lower nibbles of the data at about the same time into the DIMM 170. Line 5 of FIG. 7 shows the upper nibble data strobe replacing the data mask signal that appeared in line 5 of FIG. 6 for the non-×4 write operation.

In this operation, the signals DQen, DQSen and intDQS0 are again high. However, the memory controller, based on the information (received from the DIMM, a configuration table or other source) that the DIMM includes ×4 devices, now drives intDQS9 as a data strobe for the upper nibble, but does not drive intDM0. The ×4CtrlWr and ×4CtrlWrOE are driven high.

The byte of data is passed through MUX 570 (as in the non-×4 write) and the gate 640 to the MDAT pins 510, and then over the bus 241 to the DIMM. The DQS0 data strobe passes through MUX 590 (again, just as in the non-×4 write), and, because DQSen is high, the data strobe DQS0 is passed through gate 660 to the DQS0 pin 520.

Because the ×4CtrlWr signal is high, the intDQS9 signal on line 1 of MUX 530 is selected, and is then passed through gate 610 (because DQSen is high and ×4CtrlWrOE is high). Accordingly, the intDQS9 data strobe generated by the memory controller 210 is provided to the DIMM via pin 500 and bus 241.

As with the non-×4 write operation, MUXes 590–600 and gate 660 provide timing balance for the intDQS0 signal (to balance MUXes 530–540 and gate 610), as do MUXes 570–580 and gate 640 for the DQout signal, achieving a coordinated set of data signals with upper and lower nibble data strobes, as in lines 4–6 of FIG. 7.

Emulating a Masking Function for a ×4 Write Operation

Because the masking pins are used for the DQS strobes for write operations from ×4 DIMMs, the conventional masking procedure using those pins is unavailable for ×4 mode. However, it is still useful to have a masking function available for ×4 write operations.

When a data word (e.g. 64 bits) is written to a non-×4 DIMM, some subset of that word may be masked. Conventionally, the data is masked on a byte-by-byte basis, with a "0" mask bit indicated that the byte is to be written and a "1" causing masking of that byte. In this way, anywhere between zero and eight of the bytes in the 64-bit word are actually written to memory.

In order to achieve the same result for a ×4 write operation, a read-modify-write procedure is used. Thus, when a new data word is to be written to a ×4 DIMM, the stored word at the target address is first read from the DIMM. Then, each byte that should not be masked is written over the existing, corresponding bytes. The bytes in the word to be written that should be masked are not written over their existing, corresponding bytes.

Accordingly, only the bytes that would not normally be masked are written over the existing data. The modified data word is then written back into the DIMM.

Although this workaround procedure requires several steps (versus a simultaneous masking operation for a non-×4 write), it accomplishes the same function, and allows the masking bits to be used for ×4 DQS strobes as described above.

Conclusion

Providing system 100 with a memory controller 210 having a hybrid data read/write circuit and read data FIFO as depicted in FIG. 3 allows a user to insert ×4 or non-×4 DIMMs into the system as desired and in any combination. Once provided with the information that a given DIMM is either ×4 or non-×4, which can be done dynamically by reading one or more pins and/or using a configuration register identifying the DIMM type, from then on any read and write operations to that DIMM will automatically be controlled for the appropriate type of memory device.

In particular, the DQS data strobe for the upper nibbles of data bytes will be driven for a ×4 write operation, replacing the data mask signal that is driven for a non-×4 write operation. Conversely, for a ×4 read operation, the DIMM will drive a DQS signal for the upper nibble, which will be received by the memory controller via the pin usually used for the data mask signal in a non-×4 read operation.

Certain circuit elements (MUXes and gates) are used to in the embodiment of the invention appearing in FIG. 3. Other implementations are possible, maintaining the feature of the invention that the module 310 should automatically handle both ×4 and non-×4 data transfers, given the appropriate information, which in this embodiment includes the ×4CtrlWrOE and ×4CtrlWr signals. Whichever circuit implementation is selected, care should be taken that timing balance is provided as necessary to prevent data corruption.

Because of its modularity, circuit of FIG. 3 is scalable to any size system. Different byte sizes and word sizes are thus easily handled by adjusting the bus, MUX and switch sizes, numbers and arrangements as necessary.

Though the invention has been described in terms of read and write operations to ×4 and non-×4 DIMMs, the concepts of the invention are more broadly applicable to situations where a given pin, line, circuit or the like is used for multiple purposes. Such a multiple-purpose connection can be split into as many connections as there are alternatives, not limited to the binary choice of data strobe vs. data mask presented here, and appropriate MUXes and gates can be provided, generally in the manner of MUXes 530–540 and gates 610–620 of FIG. 3. Timing balance can be achieved both by closely matching the signal path lengths and by providing dummy MUXes and gates as needed to compensate for those that are actually involved in the signal routing over the multiple-purpose connections.

What is claimed is:

1. A memory controller configured to execute read and write operations with by-4 ("×4") and non-by-4 ("non-×4") memory modules, including:

an input/output circuit connecting the memory module to the memory controller, including a data transfer circuit, a data strobe transfer circuit, and a hybrid data mask/data strobe transfer circuit, wherein:

the data strobe transfer circuit is configured to transfer data strobe signals between the memory controller and the memory module during data read and write operations for both x4 and non-x4 memory modules;

the data transfer circuit is configured to transfer data signals between the memory controller and the memory module during data read and write operations for both x4 and non-x4 memory modules;

the hybrid data mask/data strobe transfer circuit is configured to transfer data mask signals between the memory controller and the memory module during data write operations for non-x4 memory modules, and is further configured to transfer data strobe signals between the memory controller and the memory module during data read and write operations for x4 memory modules;

a data mask pin configured to couple to a memory module; and a first multiplexer having as inputs an first data strobe signal and a data mask signal which are provided by the memory controller, and having a select line coupled to a x4 control write signal; and wherein the first multiplexer is configured to pass the first data strobe signal under the condition that the x4 control write signal is set, and is configured to pass the data mask signal under the condition that the x4 control write signal is not set.

2. The memory controller of claim 1, wherein the hybrid data mask/data strobe transfer circuit further includes:

a second multiplexer having as inputs a data enable signal and a data strobe enable signal which are provided by the memory controller, and having a select line coupled to the x4 control write signal; and a first gate coupled between an output of the first multiplexer and the data mask pin, the first gate having an enable line coupled to an output of the second multiplexer.

3. The memory controller of claim 2, wherein the first gate is configured to be enabled under either of the conditions that:

the x4 control write signal is set and the data strobe enable is set; and the x4 control write signal is not set and the data enable signal is set.

4. The memory controller of claim 1, wherein:

the first multiplexer is configured to pass the internal data strobe signal only when the x4 control write signal is set; and the first multiplexer is configured to pass the internal data mask signal only when the x4 control write signal is not set.

5. The memory controller of claim 2, wherein the data strobe transfer circuit includes:

a data strobe pin configured to couple to the memory module; and a third multiplexer having as inputs a second data strobe signal provided by the memory module via the data mask pin and a third data strobe signal provided by the memory module via the data strobe pin, and having a select line coupled to a x4 control read signal, the third multiplexer thereby constituting a part of both the data strobe transfer circuit and the hybrid data mask/data strobe transfer circuit;

wherein the third multiplexer is configured to pass the second data strobe signal only when the x4 control read signal is set, and is configured to pass the third data strobe signal only when the x4 control read signal is not set.

6. The memory controller of claim 5, wherein the data strobe transfer circuit further includes:

a fourth multiplexer having as an input the third data strobe signal, and configured to pass the third data strobe signal on read operations for both x4 and non-x4 memory modules.

7. The memory controller of claim 6, wherein the data transfer circuit further includes at least one set of data pins configured to transfer a byte of data between the memory controller and the memory module.

8. The memory controller of claim 7, wherein the data pins are coupled to a data bus configured to transfer at least one byte of data from the memory controller to the memory module.

9. The memory controller of claim 8, wherein the data bus includes a gate configured to be enabled when the data enable signal is set.

10. The memory controller of claim 7, wherein the data transfer circuit further includes a read data FIFO array configured to receive upper and lower nibbles of data from bytes of data received from the memory module.

11. The memory controller of claim 10, wherein:

the third multiplexer has an output coupled to an upper nibble portion of the read data FIFO array; and the fourth multiplexer has an output coupled to a lower nibble portion of the read data FIFO array.

12. The memory controller of claim 1, wherein:

the hybrid data/data mask circuit includes a circuit includes a plurality of gating components configured to control passage of the data mask signals and data strobe signals between the memory controller and a memory module; and the data transfer circuit and the data strobe transfer circuit include at least one delay matching component configured to delay their respective data signals and data strobe signals in an amount sufficient to match any delay of data mask signals and data strobe signals in the hybrid data/data mask signals due to the gating components.

13. The memory controller of claim 1, wherein:

the hybrid data/data mask circuit includes a circuit includes a plurality of first gating components configured to control passage of the data mask signals and data strobe signals between the memory controller and a memory module;

the data transfer circuit includes a plurality of first dummy gating components; and the data strobe transfer circuit includes a plurality of second gating components;

wherein the first gating components and the second gating components are configured to provide first and second delay times, respectively, for the respective signals passing through the data transfer circuit and the data strobe transfer circuit, the first and second delay times being configured to match any delay time of the signals in the hybrid data/data mask circuit due to the first gating components.

14. A memory controller configured to control data transfer operations for a first type of memory module having a first data width and a second type of memory module having a second data width, including:

a plurality of data pins configured to pass data signals between the memory controller and a memory module;

a plurality of data strobe pins configured to pass first data strobe signals between the memory controller and the memory module;

a plurality of data mask pins coupled between the memory controller and the memory module;

a plurality of first gating components configured to control passage of the data mask signals and the second data strobe signals; and a plurality of second gating components configured to delay signals passing over the data pins and the data strobe pins by an amount sufficient to balance delays in the signals passing through the first gating components;

wherein the memory controller is configured to pass data mask signals over the data mask pins for data transfer operations if the memory module is of the first type, and is further configured to pass first second data strobe signals over the data mask pins if the memory module is of the second type.

15. A processor-based system including at least one memory module, the memory module being one of a first type having a first data width and a second type having a second data width, including:

a memory controller including a first signal transfer circuit and a second signal transfer circuit coupled to the memory module;

the first signal transfer circuit configured to transfer first signals between the memory controller and the memory module; and the second signal transfer circuit configured to transfer second signals between the memory controller and the memory module when the memory module is of the first type and to transfer third signals between the memory controller and the memory module when the memory module is of the second type;

wherein the second signal transfer circuit includes first gating components configured to selectively pass the second and third signals; and the first signal transfer circuit includes dummy gating components configured to delay the first signals by an amount sufficient to match delays in passage of the second and third signals through the first gating components.

16. The system of claim 15, wherein:

the first signals comprise data signals;

the second signals comprise data mask signals; and the third signals comprise data strobe signals.

17. A method of transferring data between a requesting device coupled to a processor-based system having a memory controller and a memory module coupled to the processor-based system, the memory module being one of a first type having a first data width and a second type having a second data width, the method including the steps of:

transferring first data signals over a data transfer circuit between the memory controller and the memory module;

transferring first data strobe signals over a data strobe transfer circuit between the memory controller and the memory module; and transferring second data strobe signals over a hybrid transfer circuit if the memory module is of the first type and transferring second data signals over the hybrid transfer circuit if the memory module is of the second type;

wherein the first data width includes a data width of four bits and the second data width includes a data width of other than four bits; and wherein, in data transfers for a memory module of the first type:

correlating the first data strobe signals with a first four bits of a byte of data being transferred; and correlating the second data strobe signals with a second four bits of a byte of data being transferred.

18. The method of claim 17, wherein the second data signals comprise data mask signals, and the hybrid transfer circuit is configured to transfer the data mask signals in a write operation to the memory module.

19. The method of claim 17, including the step of balancing the timing of the first data signals and the first data strobe signals with signals transferred over the hybrid transfer circuit.

20. The method of claim 17, including an initial step of detecting whether the memory module is of the first type or the second type.

21. The method of claim 20, wherein the detecting step is carried out during a boot-up operation for the processor-based system.

22. The method of claim 20, wherein in the detecting step is carried out while the processor-based system is active, after a memory module has been hot-plugged into the system.

23. A memory controller configured to execute read and write operations with by-4 ("x4") and non-by-4 ("non-x4") memory modules, including:

an input/output circuit connecting the memory module to the memory controller, including a data transfer circuit, a data strobe transfer circuit, and a hybrid data mask/data strobe transfer circuit, wherein:

the data strobe transfer circuit is configured to transfer data strobe signals between the memory controller and the memory module during data read and write operations for both x4 and non-x4 memory modules;

the data transfer circuit is configured to transfer data signals between the memory controller and the memory module during data read and write operations for both x4 and non-x4 memory modules;

the hybrid data mask/data strobe transfer circuit is configured to transfer data mask signals between the memory controller and the memory module during data write operations for non-x4 memory modules, and is further configured to transfer data strobe signals between the memory controller and the memory module during data read and write operations for x4 memory modules;

wherein the hybrid data/data mask circuit includes a circuit includes a plurality of first gating components configured to control passage of the data mask signals and data strobe signals between the memory controller and a memory module;

the data transfer circuit includes a plurality of first dummy gating components; and the data strobe transfer circuit includes a plurality of second gating components;

wherein the first gating components and the second gating components are configured to provide first and second delay times, respectively, for the respective signals passing through the data transfer circuit and the data strobe transfer circuit, the first and second delay times being configured to match any delay time of the signals in the hybrid data/data mask circuit due to the first gating components.

* * * * *